(12) United States Patent
Subramanian et al.

(10) Patent No.: US 11,763,595 B2
(45) Date of Patent: Sep. 19, 2023

(54) METHOD AND SYSTEM FOR IDENTIFYING, TRACKING, AND COLLECTING DATA ON A PERSON OF INTEREST

(71) Applicant: Sensormatic Electronics, LLC, Boca Raton, FL (US)

(72) Inventors: Gopi Subramanian, Delray Beach, FL (US); Joseph Celi, Boca Raton, FL (US); Michael C. Stewart, Delray Beach, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/005,148

(22) Filed: Aug. 27, 2020

(65) Prior Publication Data

US 2022/0067345 A1 Mar. 3, 2022

(51) Int. Cl.
*G06V 40/16* (2022.01)
*G06T 7/73* (2017.01)
*G06V 20/52* (2022.01)
*G08B 13/196* (2006.01)
(Continued)

(52) U.S. Cl.
CPC ........ *G06V 40/165* (2022.01); *G06F 18/2148* (2023.01); *G06T 7/74* (2017.01); *G06V 20/52* (2022.01); *G06V 40/171* (2022.01); *G06V 40/173* (2022.01); *G08B 13/19697* (2013.01); *H04K 3/825* (2013.01);
(Continued)

(58) Field of Classification Search
None
See application file for complete search history.

(56) References Cited

U.S. PATENT DOCUMENTS

| | | | | |
|---|---|---|---|---|
| 5,852,669 A | * | 12/1998 | Eleftheriadis | H04N 19/85 382/250 |
| 8,559,684 B1 | * | 10/2013 | Nechyba | G06K 9/00926 382/118 |
| 9,971,933 B1 | * | 5/2018 | Shen | G06K 9/00281 |

(Continued)

FOREIGN PATENT DOCUMENTS

| | | |
|---|---|---|
| CN | 108875485 A | 11/2018 |
| CN | 110532991 A | 12/2019 |
| EP | 2620896 A | 7/2013 |

OTHER PUBLICATIONS

International Search Report issued in corresponding International Application No. PCT/US2021/071303 dated Dec. 13, 2021.

*Primary Examiner* — Delomia L Gilliard
(74) *Attorney, Agent, or Firm* — ArentFox Schiff LLP (57) ABSTRACT

A system may be configured to reliably identify, track, and collect data on a person of interest. In some aspects, the system may detect a facial representation within an image, generate a bounding box corresponding to the facial representation, determine an enhanced facial representation based at least in part on the bounding box and an image enhancement pipeline, and extract a plurality of facial features from the enhanced facial representation. Further, the system may determine quality information based on the plurality of facial features, determine that the quality information is greater than a threshold, and store the plurality of facial features in a data structure. In some aspects, the facial features may be used to identify red shoppers and green shoppers in a controlled environment.

20 Claims, 4 Drawing Sheets

(51) Int. Cl.
*H04K 3/00* (2006.01)
*G06F 18/214* (2023.01)

(52) U.S. Cl.
CPC ............... *G06T 2207/30201* (2013.01); *G06T 2207/30232* (2013.01); *G06T 2210/12* (2013.01)

(56) References Cited

U.S. PATENT DOCUMENTS

| | | | |
|---|---|---|---|
| 11,080,316 B1* | 8/2021 | Das | G06F 16/434 |
| 2003/0103647 A1* | 6/2003 | Rui | G06T 7/251 |
| | | | 382/103 |
| 2004/0117638 A1 | 6/2004 | Monroe | |
| 2008/0193020 A1* | 8/2008 | Sibiryakov | G06K 9/6203 |
| | | | 382/209 |
| 2009/0034801 A1* | 2/2009 | Hammoud | G06V 40/20 |
| | | | 382/107 |
| 2012/0170852 A1* | 7/2012 | Zhang | G06K 9/00281 |
| | | | 382/197 |
| 2012/0207358 A1* | 8/2012 | Blonk | G06V 10/60 |
| | | | 382/118 |
| 2013/0010096 A1* | 1/2013 | S | G06F 3/013 |
| | | | 348/78 |
| 2013/0218858 A1* | 8/2013 | Perelman | G06F 16/9535 |
| | | | 707/706 |
| 2014/0310208 A1* | 10/2014 | Fasel | G06V 10/426 |
| | | | 706/12 |
| 2019/0088096 A1* | 3/2019 | King | G06K 9/00288 |
| 2019/0259259 A1* | 8/2019 | Mullins | G08B 13/19682 |
| 2020/0057885 A1* | 2/2020 | Rao | G06K 9/00771 |
| 2020/0364999 A1* | 11/2020 | Mullins | G06T 7/292 |
| 2021/0019892 A1* | 1/2021 | Zhou | G06V 40/161 |

\* cited by examiner

METHOD AND SYSTEM FOR IDENTIFYING, TRACKING, AND COLLECTING DATA ON A PERSON OF INTEREST

BACKGROUND

The present disclosure relates generally to facial recognition, and more particularly, to building accurate methods and systems for identifying, tracking, and collecting data on a person of interest.

Some conventional facial recognition systems employ facial landmarks to identify persons of interests. For instance, some conventional facial recognition systems identify a person of interest by comparing facial landmark information to image data potentially including a face of the person of interest. Typically, facial landmarks are generated from image data, e.g., video frames or photographic images. As such, system accuracy may be significantly reduced when facial landmark information is generated from inferior image data. Further, in customer facing systems, facial recognition inaccuracy may drive economic loss or customer dissatisfaction, and squander opportunities for advanced user engagement. For example, in a retail loss prevention context, a facial recognition system incorrectly identifying a customer as a person of interest associated with theft may embarrass the customer and potentially expose the retailer to legal action.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for accurately identifying, tracking, and collecting data on a person of interest.

In an aspect, a method for generating accurate and reliable facial feature information comprises detecting a facial representation within an image, generating a bounding box corresponding to the facial representation, determining an enhanced facial representation based at least in part on the bounding box and an image enhancement pipeline, extracting a plurality of facial features from the enhanced facial representation, determining quality information based on the plurality of facial features, determining that the quality information is greater than a threshold, and storing the plurality of facial features in a data structure.

In some implementations, the facial feature information may be employed in a method comprising detecting an alarm event associated with a detection system (e.g., a pedestal of an electronic article surveillance system), identifying a face associated with the facial features in a second image captured by the video capture device, determining that the facial features are associated with a list of red shoppers, and triggering an alarm notification based at least in part on detecting the alarm event and determining that the facial features are associated with the list of red shoppers. In some other implementations, the facial feature information may be employed in a method comprising detecting a jamming event associated with a pedestal, identifying a face associated with the facial features in a second image captured by the video capture device, determining that the facial features are associated with a list of red shoppers, and triggering an alarm notification based at least in part on the detecting the jamming event and the determining that the facial features are associated with the list of red shoppers.

In some implementations, the facial feature information may be employed in a method comprising identifying a face associated with the facial features in a second image captured by the video capture device, determining that the facial features are associated with a list of shoppers, collecting customer information associated with the facial features, and sending, based at least in part on the detecting and the determining, the customer information to an associate device.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses for accurate identification, tracking, and data collection on persons of interest within a controlled environment. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one problem solved by the present solution is generating reliable facial feature information to employ for accurately and efficiently identifying persons of interest despite unfavorable image data with which to generate the facial feature information. For example, this present disclosure describes systems and methods to generate and employ reliable facial feature information from less than ideal source image data by enhancing the source image data and filtering out substandard facial feature information.

Implementations of the present disclosure may be useful for system designers and system operators endeavoring to employ a highly-accurate facial recognition system. For example, operators of facial recognition systems in customer facing contexts have been reluctant to employ facial recognition for certain measures given the dangers of acting on a false negative or false positive. The present solution provides improved accuracy in such scenarios by generating and maintaining a data store of reliable facial feature information.

Figure 1:
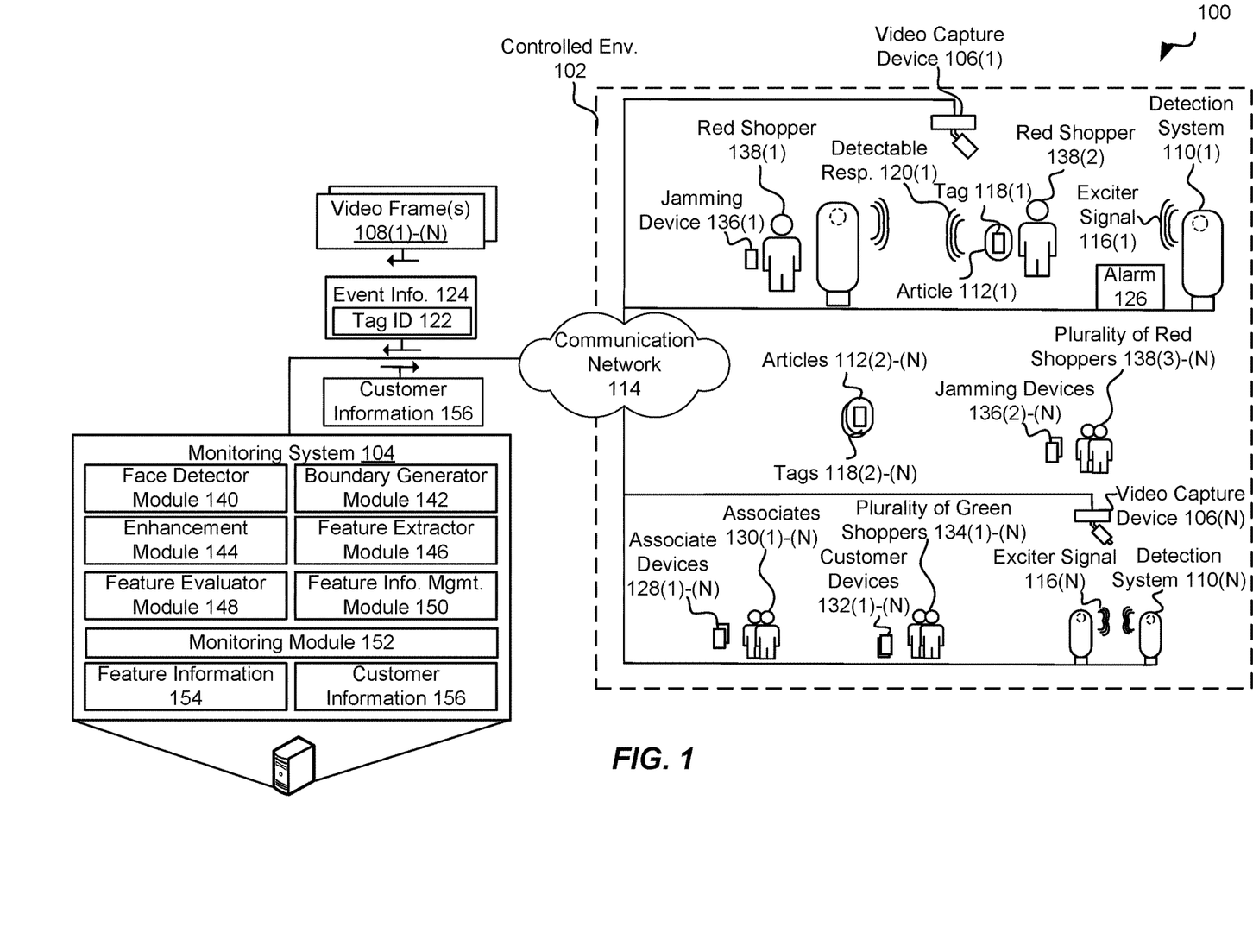
FIG. 1 is a schematic diagram of a system for identifying, tracking, and collecting data on persons of interest within a controlled environment, according to some implementations.

Referring to FIG. 1, in one non-limiting aspect, a system 100 is configured to generate reliable facial feature information, and may identify, track, and collect data on persons of interest within a controlled environment 102 based on the facial feature information. For example, system 100 is configured to generate reliable facial feature information, and employ the facial feature information to accurately identify and assist preferred shoppers, while detecting unauthorized activity by known bad actors, e.g., patrons suspected of stealing.

As illustrated in FIG. 1, the system 100 may identify, track, and collect data on persons of interest within a controlled environment 102. The system 100 may include a monitoring system 104, one or more video capture devices 106(1)-(N), a detection system 110, and a communication network 114. The monitoring system 104 may be configured to monitor the persons of interest within the controlled environment 102. The one or more video capture devices 106(1)-(N) may be configured to capture video frames 108(1)-(N) within the controlled environment 102 and send the video frames 108(1)-(N) to the monitoring system 104. Further, the detection system 110 may be configured to prevent the unauthorized removal of articles 112(1)-(N) from the controlled environment 102. In some aspects, the monitoring system 104, video capture devices 106(1)-(N), and detection system 110 may communicate via the communication network 114. In some implementations, the communication network 114 may include one or more of a wired and/or wireless private network, personal area network, local area network, wide area network, or the Internet.

In some aspects, the detection system 110 may include one or more antenna pedestals configured to create a surveillance zone at an exit, a private area (e.g., fitting room, bathroom, etc.), or a checkout area of the controlled environment 102. In some aspects, the detection system 110 may transmit exciter signals 116(1)-(N) (e.g., a RFID interrogation signal) that cause the security tags 118(1)-(N) to produce detectable responses 120(1)-(N) if an unauthorized attempt is made to remove one or more articles 112 from the controlled environment 102.

For example, the security tag 118(1) may be attached to the article 112(1). Further, the detection system 110 may transmit an exciter signal 116(1) that causes the security tag 118(1) to respond with a detectable response 120(1). In some aspects, each security tag 118 may be associated with a tag identifier 122. For instance, the security tag 116(1) may be associated with the tag identifier 122(1). Further, the detectable response 118(1) may include the tag identifier 122(1). Upon receipt of the detectable responses 120(1)-(N), the detection system 110 may send event information 124(1)-(N) to the monitoring system 104 and/or trigger an alarm 126. In some examples, the alarm 126 may be a visual notification, audible notification, or electronic communication (e.g., text message, email, etc.).

As illustrated in FIG. 1, the system 100 may include one or more associate devices 128(1)-(N) associated with one or more associates 130(1)-(N), one or more customer devices 132(1)-(N) associated with one or more green shoppers 134(1)-(N), and one or more jamming devices 136(1)-(N) associated with one or more red shoppers 138(1)-(N). The associates 128(1)-(N) may be employed or otherwise associated with an operator of the controlled environment 102. Further, the associate devices 130(1)-(N) may be used by the associates 128(1)-(N) in furtherance of their activities within the controlled environment 102. For example, the associates 128(1)-(N) may employ the associate devices 130(1)-(N) for customer assistance, customer sales, etc. Some examples of the associate devices 130(1)-(N) and the customer devices 134(1)-(N) include wearable devices (e.g., optical head-mounted display, smartwatch, etc.), smart phones and/or mobile devices, laptop and netbook computing devices, tablet computing devices, digital media devices and eBook readers, and any other device capable of receiving information from the monitoring system 104 or the detection system 110.

The green shoppers 132(1)-(N) may be customers enrolled in a customer loyalty program or having another type pre-existing relationship with an operator or user of the monitoring system 104 and/or detection system 110. The red shoppers 138(1)-(N) may be customers previously-identified as having participated in unauthorized activity within the controlled environment 102 or another controlled environment. Further, the red shoppers 138(1)-(N) may employ the jamming devices 138(1)-(N) to disrupt the detection system 110 in order to facilitate unauthorized removal of the articles 112(1)-(N) from the controlled environment 102 without triggering detectable responses 120(1)-(N). For example, a first red shopper 138(1) may employ the jamming device 136(1) to disrupt the operation of the detection system 110, while a second red shopper 138(2) attempts to exit the controlled environment 102. In some aspects, the jamming devices 138(1)-(N) may be configured to transmit a jamming signal to frustrate operation of the detection system 110. Further, the detection system 110 may be configured to detect the presence of a jamming device 136 or an occurrence of a jamming event related to transmission of a jamming signal, and send the event information 122(1)-(N) to the monitoring system 104 and/or trigger the alarm 124. Additionally, or alternatively, the detection system 110 may send the event information 122(1)-(N) to the monitoring system 104, and the monitoring system 104 may detect the presence of a jamming device 136 or an occurrence of a jamming event based upon the event information 124(1)-(N). Further, in some aspects, the monitoring system 104 and/or the detection system 110 may employ machine learning techniques and/or pattern recognition techniques to detect the presence of a jamming device 136 or an occurrence of a jamming event.

As illustrated in FIG. 1, the monitoring system 104 may include a face detector module 140, a boundary generator module 142, an enhancement module 144, a feature extractor module 146, a feature evaluator module 148, a feature information management module 150, a monitoring module 152, feature information 154, and customer information 156. The face detector module 140 may be configured to detect a face in the video frames 108(1)-(N) received from the video capture devices 106(1)-(N). For instance, the face detector module 140 may be a facial recognition system employing machine learning and/or pattern recognition techniques to identify a face within the video frame 106(1). In some aspects, the face detector module 140 may identify a face within the video frame 106(1) based at least in part on one or more machine learning models configured to identify facial landmarks. Further, the boundary generator module 142 may be configured to generate boundary representations around faces within video frames 106(1)-(N). For example, the boundary generator module 142 may generate a boundary box around a face within the video frame 108(1).

The enhancement module 144 may be configured to perform one or more enhancement processes on the boundary representations to determine enhanced representations. For example, the enhancement module 144 may perform one or more enhancement methods on the boundary box to generate an enhanced representation. Some examples of enhancement methods include light correction, shadow effect filtering, and histogram equalization. In particular, the enhancement module 144 may scale a video frame to a pre-defined resolution for uniformity and consistency across subsequent enhancement processes, apply a gamma intensity correction (GIC) to the boundary representation to correct lighting variations within the boundary representations, apply a difference of Gaussian filtering algorithm to the boundary representations to reduce or eliminate shadowing effects within the boundary representations, and/or apply a histogram equalization to the boundary representations to improve the image contrast within the boundary representations. In some aspects, the enhancement module 144 may be a graphics processing pipeline that performs at least one of the above enhancement methods in any order.

The feature extractor module 146 may be configured to extract facial feature sets from the enhanced representations. For example, the feature extractor module 146 may be configured to extract a first facial feature set from a first enhanced representation corresponding to the video frame 108(1). Each facial feature set may include a vector of facial landmarks. As used herein, in some aspects, a facial landmark may refer to a descriptor that may be used to define a face. Some examples of a facial landmark may include the left eyebrow outer corner, left eyebrow inner corner, right eyebrow outer corner, right eyebrow inner corner, left eye outer corner, left eye inner corner, right eye outer corner, right eye inner corner, nose tip, left mouth corner, right mouth corner, eye centers, left temple, right temple, chin tip, cheek contours, left eyebrow contours, right eyebrow contours, upper eyelid centers, lower eyelid centers, nose saddles, nose peaks, nose contours, mouth contours, the distance between the eye centers, the distance between the nose tip and lips, etc.

The feature evaluator module 148 may be configured to determine a quality of the facial feature sets extracted from the enhanced representations. For instance, the feature evaluator module 148 may be configured to determine a quality rating or score of the first facial feature set. In some aspects, the quality rating or score may be based at least in part on a face detection confidence score, a facial landmark score, a Haar cascade analysis, or an occlusion percentage associated with the face representation. For instance, the feature evaluator module 148 may determine a face detection score, a facial landmark score, perform Haar cascade analysis, and/or an occlusion percentage for the first facial feature set, and generate a quality rating or score based on the face detection score, the facial landmark score, the results of the Haar cascade analysis, and/or the occlusion percentage.

The feature information management module 150 may be configured to manage storage of the facial feature sets. In some aspects, the feature information management module 150 may determine whether to store a facial feature set based upon a measured quality. For instance, the feature information management module 150 may store the first facial feature set within the feature information 154 when a quality score or rating associated with the first facial feature set is greater than or equal to a threshold value. In some aspects, the feature information management module 150 generate a face identifier corresponding to the first facial feature set and store vector information including the face identifier and the first facial feature set. Further, the face identifier may be used by the monitoring system 104 to reference the corresponding face and/or facial feature set.

Further, in some aspects, the feature information management module 150 may replace facial feature sets within the feature information 154 with facial feature sets of a higher quality. For example, if the feature information management module 150 determines that a first facial feature set stored in the feature information 154 and a second facial feature set recently generated by the feature extractor module 146 correspond to same face, the feature information management module 150 may replace the first facial feature set with the second facial feature set within the feature information 154 when the quality score or rating of the second facial feature set is higher than the quality score or rating of the first facial feature set.

In some aspects, the feature information management module 150 may coordinate an enrollment process for the green shoppers 132(1)-(N) and/or the red shoppers 138red shoppers 138(1)-(N) that generates feature information 154 and/or customer information 156 for the green shoppers 132(1)-(N) and/or the red shoppers 138(1)-(N). For instance, the one or more red shoppers 138(1)-(N) may each have a video frame 108 or photographic image captured in response to performing one or more unauthorized activities within the controlled environment 102 or another controlled environment associated with an operator of the controlled environment 102. Further, as described in detail herein, the video frames 108 may be used to generate the facial feature sets for the red shoppers 138(1)-(N). Further, in some aspects, a facial feature sets for a red shopper 138(1) may be distributed to one or more other monitoring systems (e.g., monitoring systems within a geographic region associated with the red shopper 138) as a loss prevention measure. In another instance, the one or more green shoppers 132(1)-(N) may each have a video frame 108 or photographic image captured in response to forming a relationship with an operator of the controlled environment (e.g., enrolling a customer loyalty program). Further, as described in detail herein, the video frame 108 may be used to generate the facial feature sets for the green shoppers 132(1)-(N). In addition, the monitoring system 104 may collect customer information 156 associated with the one or more green shoppers 132(1)-(N). In some aspects, the customer information 156 may include name, address, email address, demographic attributes, shopping preferences, shopping history, membership information (e.g., a membership privileges), financial information, etc.

Further, the monitoring module 152 may be configured to identify the presence of the green shoppers 132(1)-(N) and/or the red shoppers 138(1)-(N) within the controlled environment 102 based upon the feature information 154. For example, the green shopper 132(1) may enter the controlled environment 102. In response, the video capture device may capture a video frame 108(1) including the green shopper 132(1), and send the video frame 108(1) to the monitoring system 104. Upon receipt of the video frame 108(1), the monitoring system 104 may generate a facial feature set, and the monitoring module 152 may determine that the generated facial feature set matches facial feature set stored in the feature information 154. Further, the monitoring module 152 may determine that the facial feature set within the feature information 154 corresponds to the green shopper 132(1), and identify customer information 156 corresponding to the green shopper 132(1). For example, the monitoring module 152 may identify customer information 156 including a picture of the green shopper 132(1), the name of the green shopper 132(1), the phonetic spelling of the name of the green shopper 132(1), recent transaction history of the green shopper 132(1), financial account information, and one or more articles 112 that may be of interest to the green shopper 132(1). In addition, the monitoring module 152 may send the customer information 156 to the associate device 130(1) so that the associate 128(1) may assist the green shopper 132(1). For example, the associate device 130(1) may generate a notification in response to the customer information 156, and present the customer information 156 on the graphical displays of the one or more associate devices 130(1)-(N), e.g., the customer information 156 may be displayed on an optical head-mounted display worn by the associate 128(1) closest to a region of the controlled environment 102 occupied by the green shopper 132(1). In response, the associate 128(1) may locate the green shopper 132(1) and perform a formal introduction. Further, the associate 128(1) may recommend the one or more articles 112 for purchase, and facilitate purchase of the articles 112 using the financial information.

In another example, the green shopper 132(1) may exit the controlled environment 102. In response, the video capture device may capture a video frame 108(1) including the green shopper 132(1), and send the video frame 108(1) to the monitoring system 104. Upon receipt of the video frame 108(1), the monitoring system 104 may generate a facial feature set, and the monitoring module 152 may determine that the generated facial feature set matches facial feature set stored in the feature information 154. Further, the monitoring module 152 may send a notification to the associate devices 130(1)-(N) that the green shopper 132(1) has exited the controlled environment 102.

As another example, the red shopper 138(2) may be within the vicinity of the detection system 110(1) of the controlled environment 102. In response, the video capture device 106(1) may capture a video frame including the red shopper 138(2), and send the video frame 108(1) to the monitoring system 104. Upon receipt of the video frame 108(1), the monitoring system 104 may generate a facial feature set, and the monitoring module 152 may determine that the generated facial feature set matches a facial feature set stored in the feature information 154. Further, the monitoring module 152 may determine that the facial feature set stored within the feature information 154 corresponds to a red shopper 138. In some instances, the feature information 154 may indicate which of the facial feature sets belong to the red shoppers 138(1)-(N) with a red shopper indicator. Alternatively, in some other instances, the feature information 154 may indicate the particular red shopper 138 associated with the facial feature set. In addition, the monitoring module 152 may receive the event information 122(1) indicating that a detectable response 118(1) has been received from the security tag 118(1) at a first period of time. Additionally, the monitoring module 152 may trigger the alarm 126 at the detection system 110 and/or one or more of the associate devices 130(1)-(N) when the video frame 108(1) is captured within a threshold period of time of the receipt of the detectable response 118(1) at the detection system 110(1). Accordingly, the feature information 154 may be used to reinforce the detection system 110, which may suffer from false positives due to reflections, blockages, and other conditions that may cause stray tag reads.

As yet still another example, the first red shopper 138(1) and the second red shopper 138(1) may be within the vicinity of the detection system 110(1) of the controlled environment 102. In response, the video capture device 106(1) may capture video frames 108 including the first red shopper 138(1) and the second red shopper 138(1), and send the video frames 108 to the monitoring system. Upon receipt of the video frames 108, the monitoring system 104 may generate facial feature sets for the first red shopper 138(1) and the second red shopper 138(1), respectively, and the monitoring module 152 may determine that the generated facial feature sets match facial feature sets stored in the feature information 154. Further, the monitoring module may determine that the facial feature sets stored within the feature information 154 correspond to the first red shopper 138(1) and the second red shopper 138(1), respectively. In addition, the monitoring module 152 may receive the event information 122(1) indicating that a jamming event is occurring at the detection system101(1). Additionally, the monitoring module 152 may trigger the alarm 126 at the detection system 110 and/or one or more of the associate devices 130(1)-(N) when the video frame 108(1) is captured within a threshold period of time of the detection of the jamming event at the detection system 110(1).

Figure 2:
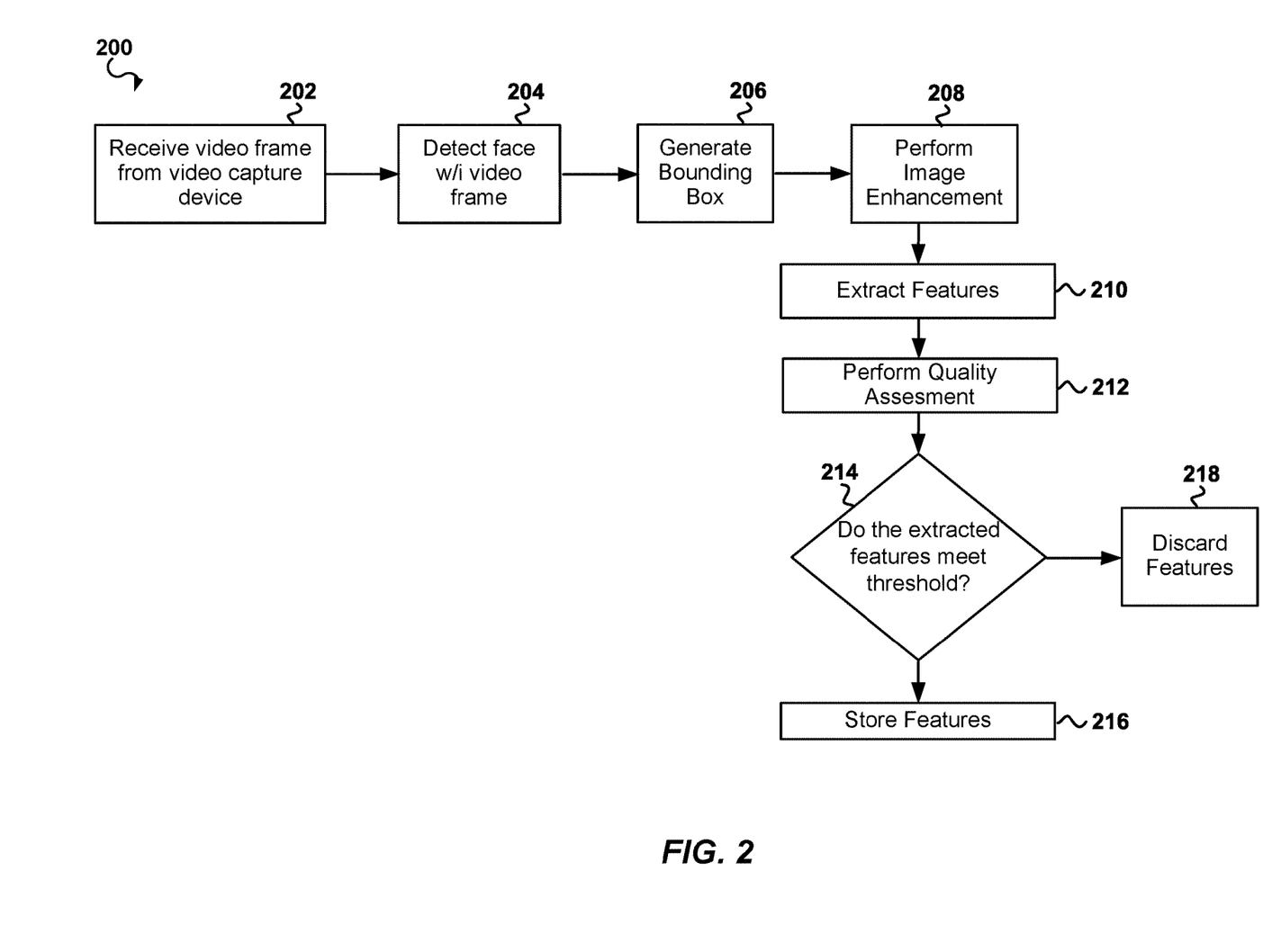
FIG. 2 is a flow diagram of an example of a method of generating accurate and reliable facial landmark information, according to some implementations.

FIG. 2 is a flowchart of a method 200 of generating reliable facial landmark information. The method 200 may be performed by the monitoring system 104 or the computing device 400.

At block 202, the video capture device 106(1) may capture a video frame 108(1) including a face, e.g., a face of a red shopper 138(1) or a green shopper 132(1), and provide the video frame 108(1) to the monitoring system 104. At block 204, the monitoring system 104 may detect the face within the video frame 108(1). At block 206, the monitoring system 104 may generate a bounding box around the face within the video frame 108(1). At block 208, the monitoring system 104 may perform image enhancement on the contents of the bounding box. For example, the monitoring system 104 may perform formatting and enhancement processes on the contents of the bounding box. At block 210, the monitoring system 104 may extract facial features from the processed video frame. At block 212, the monitoring system 104 may perform a quality assessment of the extracted features. For example, the monitoring system 104 may determine a quality score or rating for the extracted features. At block, 214, the monitoring system 104 may determine whether the extracted features meet a threshold level of quality. For example, the monitoring system 104 may determine whether the quality score or rating is equal to or greater than a threshold quality score or rating.

If the extracted features meet the threshold level of quality, the monitoring system 104 may proceed to block 216. At block 216, the monitoring system 104 may store the extracted features for later use as described in detail herein. If extracted features fail to meet the threshold level of quality, the monitoring system 104 may proceed to block 218. At block 218, the monitoring system 104 may discard the extracted features. Further, this process may be repeated on subsequent video frames (e.g., one of the video frames 108(2)-(N)) captured by the same video capture device 106(1) or another video capture device (e.g., one of the video capture devices 106(2)-(N)).

Figure 3:
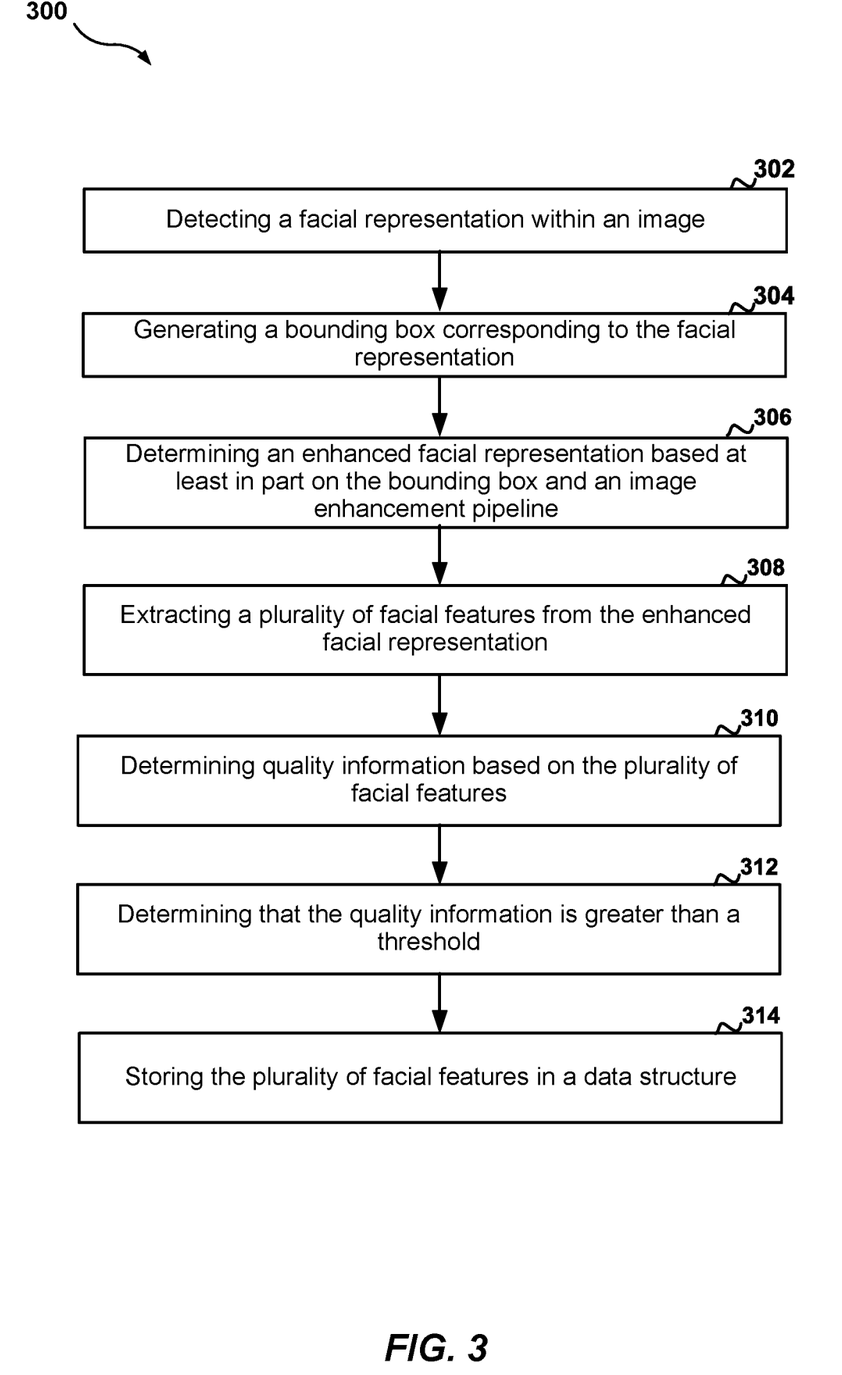
FIG. 3 is a flow diagram of an example of a method of implementing a system for accurately identifying, tracking, and collecting data on persons of interest within a controlled environment, according to some implementations.

Referring to FIG. 3, in operation, the monitoring system 104 or computing device 400 may perform an example method 300 for implementing a system for accurately identifying, tracking, and collecting data on a person of interest. The method 300 may be performed by one or more components of the monitoring system 104, the computing device 400, or any device/component described herein according to the techniques described with reference to FIG. 1.

At block 302, the method 300 includes detecting a facial representation within an image. For example, the face detector module 140 may be configured to detect a face in a video frame 108(1) received from the video capture device 106(1).

At block 304, the method 300 includes generating a bounding box corresponding to the facial representation. For example, the boundary generator module 142 may be configured to generate a boundary around the face within the video frame 108(1).

At block 306, the method 300 includes determining an enhanced facial representation based at least in part on the bounding box and an image enhancement pipeline. For example, the enhancement module 144 may perform one or more enhancement methods on the boundary box to generate an enhanced facial representation. In some examples, the enhancement methods may form an enhancement pipeline implemented by the enhancement module 144. Further, the enhancement pipeline may include formatting the bounding box, applying GIC to the bounded box, applying a difference of Gaussian filtering algorithm to the bounding box, and performing histogram equalization over the bounding box. Consequently, the method 300 may improve the quality of the source image data used to generate facial feature information, thereby improving the accuracy and reliability of facial feature information when used in a facial recognition system.

At block 308, the method 300 includes extracting a plurality of facial features from the enhanced facial representation. For example, the feature extractor module 146 may be configured to the extract a facial feature set from the enhanced facial representation corresponding to the video frame 108(1).

At block 310, the method 300 includes determining quality information based on the plurality of facial features. For example, the feature evaluator module 148 may be configured to determine a score or rating of the facial feature set extracted from the enhanced facial representation.

At block 312, the method 300 includes determining that quality information is greater than a threshold. For example, the feature information management module 150 may determine whether the quality information is greater or equal than a threshold.

At block 314, the method 300 includes storing the plurality of facial features in a data structure. For example, the feature information management module 150 may store the facial feature set within the feature information 154 when the quality score or rating associated of the facial feature set is greater than or equal to the threshold. Consequently, the method 300 may filter inadequate facial feature information, thereby preventing a facial recognition system from producing inaccurate results based on poor facial feature information.

Figure 4:
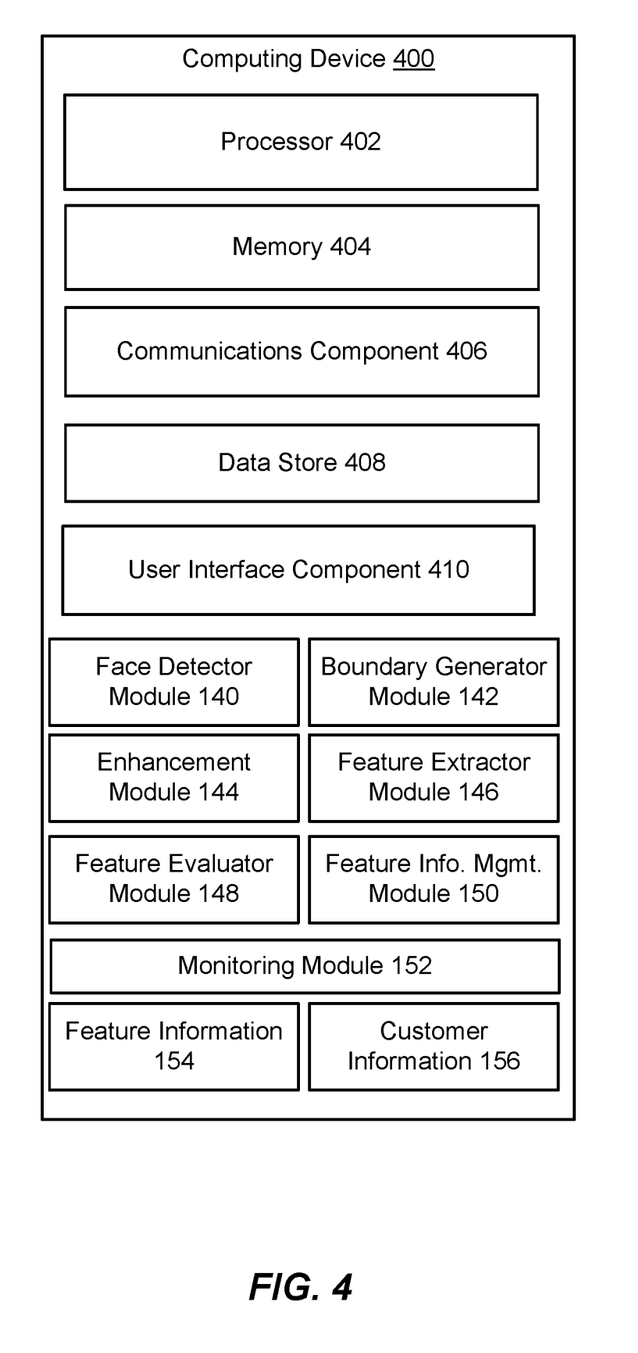
FIG. 4 is block diagram of an example of a computer device configured to implement a system for accurately identifying, tracking, and collecting data on persons of interest within a controlled environment, according to some implementations.

Referring to FIG. 4, a computing device 400 may implement all or a portion of the functionality described herein. The computing device 400 may be or may include or may be configured to implement the functionality of at least a portion of the system 100, or any component therein. For example, the computing device 400 may be or may include or may be configured to implement the functionality of the monitoring system 104, video capture device 106, detection system 110, the associate device 130, the customer device 134, or the jamming device 136. The computing device 400 includes a processor 402 which may be configured to execute or implement software, hardware, and/or firmware modules that perform any functionality described herein. For example, the processor 402 may be configured to execute or implement software, hardware, and/or firmware modules that perform any functionality described herein with reference to the face detector module 140, the boundary generator module 142, the enhancement module 144, the feature extractor module 146, the feature evaluator module 148, the feature information management module 150, the monitoring module 152, or any other component/system/device described herein.

The processor 402 may be a micro-controller, an application-specific integrated circuit (ASIC), a digital signal processor (DSP), or a field-programmable gate array (FPGA), and/or may include a single or multiple set of processors or multi-core processors. Moreover, the processor 402 may be implemented as an integrated processing system and/or a distributed processing system. The computing device 400 may further include a memory 404, such as for storing local versions of applications being executed by the processor 402, related instructions, parameters, etc. The memory 404 may include a type of memory usable by a computer, such as random access memory (RAM), read only memory (ROM), tapes, magnetic discs, optical discs, volatile memory, non-volatile memory, and any combination thereof. Additionally, the processor 402 and the memory 404 may include and execute an operating system executing on the processor 402, one or more applications, display drivers, etc., and/or other components of the computing device 400.

Further, the computing device 400 may include a communications component 406 that provides for establishing and maintaining communications with one or more other devices, parties, entities, etc. utilizing hardware, software, and services. The communications component 406 may carry communications between components on the computing device 400, as well as between the computing device 400 and external devices, such as devices located across a communications network and/or devices serially or locally connected to the computing device 400. In an aspect, for example, the communications component 406 may include one or more buses, and may further include transmit chain components and receive chain components associated with a wireless or wired transmitter and receiver, respectively, operable for interfacing with external devices.

Additionally, the computing device 400 may include a data store 408, which can be any suitable combination of hardware and/or software, that provides for mass storage of information, databases, and programs. For example, the data store 408 may be or may include a data repository for applications and/or related parameters not currently being executed by processor 402. In addition, the data store 408 may be a data repository for an operating system, application, display driver, etc., executing on the processor 402, and/or one or more other components of the computing device 400.

The computing device 400 may also include a user interface component 410 operable to receive inputs from a user of the computing device 400 and further operable to generate outputs for presentation to the user (e.g., via a display interface to a display device). The user interface component 410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 410 may include one or more output devices, including but not limited to a display interface, a speaker, a haptic feedback mechanism, a printer, any other mechanism capable of presenting an output to a user, or any combination thereof.

What is claimed is:

1. A method comprising:
    detecting a facial representation within a first image;
    generating a bounding box corresponding to the facial representation;
    determining an enhanced facial representation based at least in part on applying an image enhancement pipeline to contents of the bounding box, wherein the applying includes applying a shadow effect filter and a histogram equalization to the bounding box;
    extracting a plurality of facial features from the enhanced facial representation;
    determining quality information based on the plurality of facial features;
    determining that the quality information is greater than a threshold;
    storing the plurality of facial features in a data structure; and
    determining if the plurality of facial features associated with the first image matches facial features of a person from a second image with the second image being associated with a list of green shoppers.

2. The method of claim 1, further comprising:
    detecting an alarm event associated with a pedestal;
    determining if the plurality of facial features associated with the first image matches facial features of a person from a second image with the second image being associated with a list of red shoppers; and
    triggering an alarm notification based at least in part on the detecting and the determining.

3. The method of claim 1, further comprising:
    detecting a jamming event associated with a pedestal;
    determining if the plurality of facial features associated with the first image matches facial features of a person from a second image with the second image being associated with a list of red shoppers; and
    triggering an alarm notification based at least in part on the detecting and the determining.

4. The method of claim 1, further comprising:
    collecting customer information associated with the plurality of facial features in response to determining that the plurality of facial features associated with the first image matches facial features of the person from the second image with the second image being associated with the list of green shoppers; and
    sending, based at least in part on the detecting and the determining, the customer information to an associate device.

5. The method of claim 1, wherein determining the enhanced facial representation further comprises at least one of:
    applying a resolution formatting method to the bounding box; or
    applying a light correction method to the bounding box.

6. The method of claim 1, wherein determining the quality information based on the plurality of facial features comprises at least one:
    determining a face detection confidence score;
    determining a facial landmark score;
    performing a Haar cascade analysis; or
    determining an occlusion percentage associated with the facial representation.

7. The method of claim 1, wherein storing the plurality of facial features:
    assigning a face identifier to the plurality of facial features; and
    storing a vector including the face identifier and the plurality of facial features.

8. The method of claim 1, wherein the facial representation is a first facial representation, the bounding box is a first bounding box, the enhanced facial representation is a first enhanced facial representation, the plurality of facial features are a first plurality of facial features, and the quality information is first quality information, and further comprising:
    detecting a second facial representation within a second image;
    generating a second bounding box corresponding to the second facial representation;
    determining a second enhanced facial representation based at least in part on the second bounding box and the image enhancement pipeline;
    extracting a second plurality of facial features from the second enhanced facial representation;
    determining second quality information based on the second plurality of facial features;
    determining that the second quality information is lesser than the threshold; and
    disregarding the second plurality of facial features.

9. The method of claim 1, wherein the facial representation is a first facial representation, the bounding box is a first bounding box, the enhanced facial representation is a first enhanced facial representation, the plurality of facial features are a first plurality of facial features, and the quality information is first quality information, and further comprising:
  detecting a second facial representation within a second image;
  generating a second bounding box corresponding to the second facial representation;
  determining a second enhanced facial representation based at least in part on the second bounding box and the image enhancement pipeline;
  extracting a second plurality of facial features from the second enhanced facial representation;
  determining that the second plurality of facial features correspond to a same face as the first plurality of facial features;
  determining second quality information based on the second plurality of facial features;
  determining that the second quality information is greater than the first quality information; and
  replacing, within the data structure, the first plurality of facial features with the second plurality of facial features.

10. A system comprising:
management device comprising:
  a memory; and
  at least one processor coupled to the memory and configured to:
    detect a facial representation within a first image;
    generate a bounding box corresponding to the facial representation;
    determine an enhanced facial representation based at least in part on applying an image enhancement pipeline to contents of the bounding box, wherein the applying includes applying a shadow effect filter and a histogram equalization to the bounding box;
    extract a plurality of facial features from the enhanced facial representation;
    determine quality information based on the plurality of facial features;
    determine that the quality information is greater than a threshold;
    store the plurality of facial features in a data structure; and
    determine if the plurality of facial features associated with the first image matches facial features of a person from a second image with the second image being associated with a list of green shoppers.

11. The system of claim 10, further comprising a pedestal and a video capture device, and the at least one processor is configured to:
  detect an alarm event associated with the pedestal;
  determine if the plurality of facial features associated with the first image matches facial features of a person from a second image with the second image being associated with a list of red shoppers; and
  trigger an alarm notification based at least in part on the detecting and the determining.

12. The system of claim 10, further comprising a pedestal and a video capture device, and the at least one processor is configured to:
  detect a jamming event associated with the pedestal;
  determine if the plurality of facial features associated with the first image matches facial features of a person from a second image with the second image being associated with a list of red shoppers; and
  trigger an alarm notification based at least in part on the detecting and the determining.

13. The system of claim 10, further comprising an associate device and a video capture device, and the at least one processor is configured to:
  collect customer information associated with the plurality of facial features in response to determining that the plurality of facial features associated with the first image matches facial features of the person from the second image with the second image being associated with the list of green shoppers; and
  send, based at least in part on the detecting and the determining, the customer information to the associate device.

14. The system of claim 10, wherein to determine the enhanced facial representation the at least one processor is configured to:
  apply a resolution formatting method to the bounding box; or
  apply a light correction method to the bounding box.

15. The system of claim 10, wherein to determine the quality information based on the plurality of facial features the at least one processor is configured to:
  determine a face detection confidence score;
  determine a facial landmark score;
  perform a Haar cascade analysis; or
  determine an occlusion percentage associated with the facial representation.

16. A non-transitory computer-readable device having instructions thereon that, when executed by at least one computing device, causes the at least one computing device to perform operations comprising:
  detecting a facial representation within a first image;
  generating a bounding box corresponding to the facial representation;
  determining an enhanced facial representation based at least in part on applying an image enhancement pipeline to contents of the bounding box, wherein the applying includes applying a shadow effect filter and a histogram equalization to the bounding box;
  extracting a plurality of facial features from the enhanced facial representation;
  determining quality information based on the plurality of facial features;
  determining that quality information is greater than a threshold;
  storing the plurality of facial features in a data structure; and
  determining if the plurality of facial features associated with the first image matches facial features of a person from a second image with the second image being associated with a list of green shoppers.

17. The non-transitory computer-readable device of claim 16, the operations further comprising:
  detecting an alarm event associated with a pedestal;
  determining if the plurality of facial features associated with the first image matches facial features of a person from a second image with the second image being associated with a list of red shoppers; and
  triggering an alarm notification based at least in part on the detecting and the determining.

18. The non-transitory computer-readable device of claim 16, the operations further comprising:
- collecting customer information associated with the plurality of facial features in response to determining that the plurality of facial features associated with the first image matches facial features of the person from the second image with the second image being associated with the list of green shoppers; and
- sending, based at least in part on the detecting and the determining, the customer information to an associate device.

19. The non-transitory computer-readable device of claim 16, wherein determining the enhanced facial representation comprises at least one of:
- applying a resolution formatting method to the bounding box; or
- applying a light correction method to the bounding box.

20. The non-transitory computer-readable device of claim 16, wherein determining the quality information based on the plurality of facial features comprises at least one:
- determining a face detection confidence score;
- determining a facial landmark score;
- performing a Haar cascade analysis; or
- determining an occlusion percentage associated with the facial representation.

\* \* \* \* \*